Dec. 14, 1948.     H. L. BOWDITCH     2,455,972
COMBINATION MAGNIFYING LENS AND PUNCH OR THE LIKE
Filed April 21, 1945

INVENTOR
Hoel L. Bowditch
BY
Blair, Curtis + Hayward
ATTORNEYS

Patented Dec. 14, 1948

2,455,972

UNITED STATES PATENT OFFICE 2,455,972

COMBINATION MAGNIFYING LENS AND PUNCH OR THE LIKE

Hoel L. Bowditch, Sharon, Mass.

Application April 21, 1945, Serial No. 589,668

1 Claim. (Cl. 88—39)

This invention relates to tools such as punches, marking tools, small screw drivers, small drills, drawing instruments, etc., and facilitates use of such tools for precision work.

When tools such as above mentioned are used in working accurately to a hundredth or thousandth of an inch, an operator must either use an eye piece fitted with a magnifying lens and work with his eye close to the work, or sacrifice the desired accuracy. A jeweller, a watchmaker, or model maker, manipulating tiny screws is forced to use the same procedure. Such eye pieces are inconvenient and limit the operator to the use of one eye.

It is an object of the present invention to provide tools and/or fittings for tools to enable operators to work with the tools at normal view working distance, using both eyes.

Other objects will be in part obvious and in part pointed out as the description proceeds.

In the accompanying drawings in which similar reference characters refer to similar parts throughout:

Figure 1:
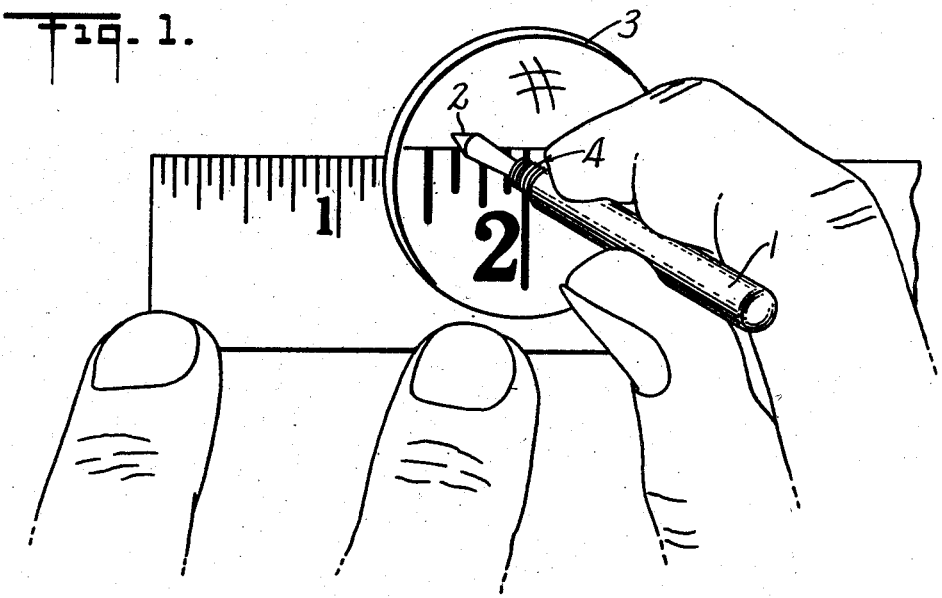
Figure 1 shows a tool and magnifying piece embodying the invention.
Figure 2:
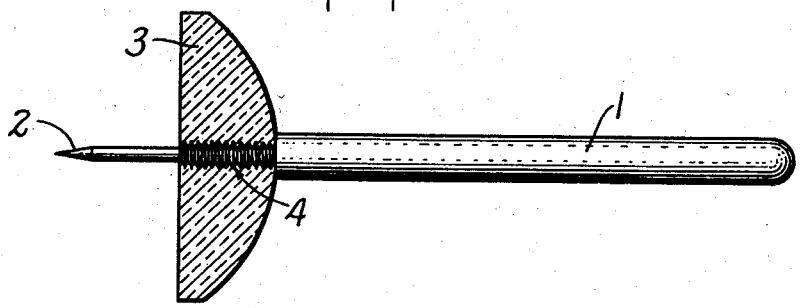
Figure 2 shows a cross section of the tool of Figure 1.

In the drawings, a punch is shown having a handle 1 and point 2. Fastened to the tool is a magnifying lens 3, shaped so that the operator when looking at the end 2 of the punch sees the end 2 enlarged as in Figure 1. He also sees the ruler or other scale device used in connection with the punch, magnified in the vicinity of the tool end 2.

The operator sees the work and tool thus magnified using both eyes as he normally would use them without the lens 3. The magnifying lens is so shaped and is so secured to the tool that the focal point of the lens is at least slightly beyond the edge or end 2 of the tool. This insures the operator's seeing the magnified portion of the work and tool properly magnified and in focus. The focal length of the lens is chosen to place the lens at a convenient working distance from the end of the tool, and so that the operator may use the tool at normal viewing distance.

The lens may be round, as shown, for punches or screw drivers, or have oblong or rectangular shapes for drawing pen, knives, or other instruments.

The lens may be made of shock resisting material so that the tools may be hammered. In addition to shock resisting glass, transparent plastics such as "Lucite" or other plastic may be used, and have the advantage that they are lighter in weight than glass and are shockproof. Plastics have the further advantage of being readily moldable and easily manufactured into the desired lens shapes.

The lens may be secured to the tool by matched threads as shown in the drawing. Such fastening means has the advantage that a number of tools of a set may be made up with threaded portions such as indicated at 4, and a single lens or different lenses offering varying degrees of magnification may be used with the set of tools and threaded onto the tool being used. Or, if preferred, the lens may be secured to the tool by cement or by clamping units or set screws.

In addition to its usefulness in connection with a punch, the novel combination has particular utility for fine drawing, etching, and stencilling work, for the lens may be secured to a pen or pencil or knife, or other sharp tool. It is particularly useful on small screw drivers for locating the screw slot with the driver and for setting micrometer screws to the correct position.

As many embodiments may be made in the above invention and as many changes may be made in the embodiment above described, it is to be understood that all matter hereinbefore set forth or shown in the accompanying drawing is to be interpreted as illustrative only and not in a limiting sense.

I claim:

In combination, a tool having an elongated generally cylindrical stem terminating in a working end, said stem and working end having a common longitudinal center line, an optical lens the periphery of which extends appreciably outwardly from said center line and said lens having a flat surface facing the working end, a convex surface facing the tool stem and having an opening therethrough concentric with the axis of said lens for receiving said stem, and holding means for holding said lens axially along said stem to position the end of said tool within the focal length of said lens, and to position the end of the tool with respect to the said periphery so that the angle between the said center line and a line passing through the end and periphery is in the order of 45°, whereby the working end of said tool may be viewed through the lens over a wide angle throughout 360° of rotation of the tool about its longitudinal center line.

HOEL L. BOWDITCH.

(References on following page)

REFERENCES CITED

The following references are of record in the file of this patent:

UNITED STATES PATENTS

| Number | Name | Date |
|---|---|---|
| 975,465 | Schnapka | Nov. 15, 1910 |
| 1,120,421 | Strickland | Dec. 8, 1914 |
| 1,181,061 | Bettencourt | Apr. 25, 1916 |
| 1,449,165 | Cameron | Mar. 20, 1923 |
| 2,242,536 | Montgomery | May 20, 1941 |
| 2,341,743 | Rothner | Feb. 15, 1944 |
| 2,376,448 | Neugass | May 22, 1945 |

FOREIGN PATENTS

| Number | Country | Date |
|---|---|---|
| 14,182 | Great Britain | 1908 |
| 355,556 | Germany | June 28, 1922 |
| 378,727 | Germany | July 30, 1923 |